US012656170B2

(12) United States Patent
Khlat

(10) Patent No.: US 12,656,170 B2
(45) Date of Patent: Jun. 16, 2026

(54) PASSIVE ACOUSTIC SENSOR CIRCUIT AND RELATED WIRELESS SENSING SYSTEM

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 219 days.

(21) Appl. No.: 18/348,745

(22) Filed: Jul. 7, 2023

(65) Prior Publication Data

US 2024/0053193 A1    Feb. 15, 2024

Related U.S. Application Data

(60) Provisional application No. 63/396,669, filed on Aug. 10, 2022.

(51) Int. Cl.
  G01H 11/06        (2006.01)
  G08C 17/02        (2006.01)
  G10K 11/04        (2006.01)
  H04Q 9/00         (2006.01)
(52) U.S. Cl.
  CPC ............. G01H 11/06 (2013.01); G10K 11/04 (2013.01); H04Q 9/00 (2013.01); G08C 17/02 (2013.01)
(58) Field of Classification Search
  CPC .......... G10K 11/04; H04Q 9/00; G01H 11/06
  See application file for complete search history.

(56) References Cited

U.S. PATENT DOCUMENTS

| | | | |
|---|---|---|---|
| 3,568,108 | A | 3/1971 | Poirier et al. |
| 4,924,195 | A | 5/1990 | Gonda |
| 6,242,843 | B1 | 6/2001 | Pohjonen et al. |
| 6,862,441 | B2 | 3/2005 | Ella |

(Continued)

FOREIGN PATENT DOCUMENTS

| | | | | |
|---|---|---|---|---|
| CN | 107727125 A | * | 2/2018 | ............... G01D 5/48 |
| DE | 102007028290 A1 | | 1/2009 | |

(Continued)

OTHER PUBLICATIONS

Translation of CN107727125.*

(Continued)

*Primary Examiner* — Helen C Kwok
(74) *Attorney, Agent, or Firm* — Withrow & Terranova, P.L.L.C

(57)          ABSTRACT
A passive acoustic sensor circuit and related wireless sensing system are provided. The passive acoustic sensor circuit is configured to induce an electrical current in response to receiving a radio frequency signal. The passive acoustic sensor circuit includes a sensor circuit, which can detect a sensory event (e.g., a touch or key press) and cause a variation in the electrical current in response to the sensory event. In contrast, the sensor circuit will not cause the variation in the electrical current in absence of the sensory event. In this regard, the presence or absence of the current variation, which can be detected remotely and wirelessly, will serve as an indication of the sensory event. By detecting the current variation remotely and wirelessly, it is possible to reduce physical wiring in an electronic device (e.g., smartphone, smartwatch, etc.) to help reduce design and manufacturing complexity of the electronic device.

20 Claims, 4 Drawing Sheets

(56) References Cited

U.S. PATENT DOCUMENTS

| | | | |
|---|---|---|---|
| 7,034,638 B2 | 4/2006 | Yamamoto et al. | |
| 7,161,434 B2 | 1/2007 | Rhodes | |
| 7,367,095 B2 | 5/2008 | Larson, III et al. | |
| 7,454,178 B2 | 11/2008 | Block et al. | |
| 7,573,354 B2 | 8/2009 | Nishihara et al. | |
| 7,656,228 B2 | 2/2010 | Fukuda et al. | |
| 7,659,796 B2 | 2/2010 | Funami et al. | |
| 7,692,270 B2 | 4/2010 | Subramanyam et al. | |
| 7,791,436 B2 | 9/2010 | Bardal et al. | |
| 7,804,374 B1 | 9/2010 | Brown et al. | |
| 7,876,179 B2 | 1/2011 | Bauer et al. | |
| 8,269,577 B2 | 9/2012 | Inoue et al. | |
| 8,576,024 B2 | 11/2013 | Erb et al. | |
| 8,620,250 B2 | 12/2013 | Erb | |
| 9,041,484 B2 | 5/2015 | Burgener et al. | |
| 9,190,979 B2 | 11/2015 | Granger-Jones et al. | |
| 9,255,912 B2 | 2/2016 | Johnston et al. | |
| 9,281,800 B2 | 3/2016 | Tsuzuki | |
| 9,438,202 B2 | 9/2016 | Reinhardt et al. | |
| 9,583,806 B2 | 2/2017 | Cho et al. | |
| 9,705,473 B2 | 7/2017 | David et al. | |
| 9,819,327 B2 | 11/2017 | Maruthamuthu et al. | |
| 9,847,769 B2 | 12/2017 | Khlat et al. | |
| 10,009,010 B2 | 6/2018 | Kando et al. | |
| 10,243,537 B2 | 3/2019 | Khlat | |
| 10,425,061 B1 | 9/2019 | Varela Campelo | |
| 10,447,322 B2 | 10/2019 | Wloczysiak | |
| 10,476,481 B2 | 11/2019 | Chen et al. | |
| 10,873,317 B2 | 12/2020 | Shen et al. | |
| 10,985,731 B2 | 4/2021 | Khlat | |
| 11,050,412 B2 | 6/2021 | Khlat et al. | |
| 11,095,268 B2 | 8/2021 | Schmidhammer | |
| 11,165,412 B2 | 11/2021 | Khlat et al. | |
| 11,165,413 B2 | 11/2021 | Khlat et al. | |
| 11,323,097 B2 | 5/2022 | Kankar et al. | |
| 11,742,818 B2 | 8/2023 | Khlat | |
| 2002/0021192 A1 | 2/2002 | Klee et al. | |
| 2002/0158717 A1 | 10/2002 | Toncich | |
| 2002/0163400 A1 | 11/2002 | Toncich | |
| 2003/0227338 A1 | 12/2003 | Kawakubo et al. | |
| 2004/0119561 A1 | 6/2004 | Omote | |
| 2006/0098723 A1 | 5/2006 | Toncich et al. | |
| 2007/0030096 A1 | 2/2007 | Nishihara et al. | |
| 2007/0107519 A1* | 5/2007 | Liu | G01P 15/0975 |
| | | | 73/649 |
| 2007/0131032 A1* | 6/2007 | Liu | G01N 29/2412 |
| | | | 324/633 |
| 2007/0296513 A1 | 12/2007 | Ruile et al. | |
| 2008/0024243 A1 | 1/2008 | Iwaki et al. | |
| 2008/0065290 A1* | 3/2008 | Breed | G01L 17/00 |
| | | | 701/31.4 |
| 2008/0129416 A1 | 6/2008 | Volatier et al. | |
| 2009/0289526 A1 | 11/2009 | Sinha et al. | |
| 2009/0315643 A1 | 12/2009 | Yamakawa et al. | |
| 2010/0308933 A1 | 12/2010 | See et al. | |
| 2012/0212304 A1 | 8/2012 | Zhang et al. | |
| 2012/0313731 A1 | 12/2012 | Burgener et al. | |
| 2013/0109332 A1 | 5/2013 | Aigner | |
| 2014/0070905 A1 | 3/2014 | Raieszadeh et al. | |
| 2014/0203887 A1 | 7/2014 | Murata et al. | |
| 2015/0163044 A1 | 6/2015 | Analui et al. | |
| 2016/0191012 A1 | 6/2016 | Khlat et al. | |
| 2016/0191016 A1* | 6/2016 | Khlat | H04B 1/10 |
| | | | 333/195 |
| 2016/0294423 A1 | 10/2016 | Yatsenko et al. | |
| 2017/0040948 A1 | 2/2017 | Levesque | |
| 2017/0048859 A1 | 2/2017 | Hayakawa | |
| 2017/0093370 A1 | 3/2017 | Khlat et al. | |
| 2017/0201233 A1* | 7/2017 | Khlat | H03H 9/542 |
| 2017/0214389 A1 | 7/2017 | Tsutsumi | |
| 2017/0230066 A1* | 8/2017 | Little | H04B 1/401 |
| 2017/0244382 A1 | 8/2017 | Lear | |
| 2017/0264268 A1 | 9/2017 | Schmidhammer | |
| 2018/0076793 A1 | 3/2018 | Khlat et al. | |
| 2018/0123562 A1 | 5/2018 | Bradley | |

| | | | |
|---|---|---|---|
| 2018/0159562 A1 | 6/2018 | Bauder | |
| 2018/0234078 A1 | 8/2018 | Wada et al. | |
| 2019/0081613 A1 | 3/2019 | Nosaka | |
| 2019/0181907 A1 | 6/2019 | Pfann et al. | |
| 2019/0199324 A1 | 6/2019 | Matsumoto et al. | |
| 2019/0260355 A1 | 8/2019 | Khlat | |
| 2019/0326944 A1 | 10/2019 | Khlat et al. | |
| 2019/0393860 A1 | 12/2019 | Shih et al. | |
| 2020/0028491 A1 | 1/2020 | Kuroyanagi | |
| 2020/0028567 A1 | 1/2020 | Ashworth | |
| 2020/0076366 A1 | 3/2020 | Bahr et al. | |
| 2020/0099360 A1* | 3/2020 | Khlat | H03H 9/02125 |
| 2020/0099362 A1* | 3/2020 | Khlat | H03H 9/02007 |
| 2020/0099363 A1 | 3/2020 | Khlat | |
| 2020/0099364 A1 | 3/2020 | Khlat | |
| 2020/0136589 A1 | 4/2020 | Khlat | |
| 2020/0162057 A1 | 5/2020 | Nakamura | |
| 2020/0274519 A1 | 8/2020 | Gamble et al. | |
| 2021/0067139 A1 | 3/2021 | Komatsu et al. | |
| 2021/0194459 A1 | 6/2021 | Alavi et al. | |
| 2021/0297097 A1 | 9/2021 | Okuda | |
| 2021/0399750 A1 | 12/2021 | Varela Campelo | |
| 2022/0385272 A1 | 12/2022 | Sun et al. | |
| 2023/0083961 A1 | 3/2023 | Komatsu et al. | |
| 2023/0093885 A1 | 3/2023 | Ella et al. | |
| 2023/0134889 A1 | 5/2023 | Costa | |
| 2023/0216485 A1 | 7/2023 | Wu et al. | |
| 2023/0223920 A1 | 7/2023 | Koohi et al. | |
| 2023/0223922 A1 | 7/2023 | Koohi et al. | |
| 2023/0223926 A1 | 7/2023 | Koohi et al. | |
| 2023/0299746 A1 | 9/2023 | Levesque | |
| 2023/0318569 A1 | 10/2023 | Jhung | |
| 2023/0402992 A1 | 12/2023 | Noguchi et al. | |
| 2023/0412149 A1 | 12/2023 | Khlat | |
| 2024/0014803 A1 | 1/2024 | Khlat | |
| 2024/0053193 A1 | 2/2024 | Khlat | |
| 2024/0097650 A1 | 3/2024 | Khlat et al. | |
| 2024/0213956 A1 | 6/2024 | Khlat et al. | |
| 2024/0258992 A1 | 8/2024 | Khlat | |
| 2024/0333257 A1 | 10/2024 | Khlat | |
| 2024/0333259 A1 | 10/2024 | Khlat | |
| 2024/0364309 A1 | 10/2024 | Khlat | |
| 2024/0413809 A1 | 12/2024 | Khlat | |

FOREIGN PATENT DOCUMENTS

| | | | |
|---|---|---|---|
| JP | 3854212 B2 | 12/2006 | |
| JP | 2009130831 A | 6/2009 | |
| JP | 4326063 B2 | 9/2009 | |
| JP | 2022548348 A | 11/2022 | |
| RU | 166154 U1 | 11/2016 | |

OTHER PUBLICATIONS

Gokhale, V. et al., "Phonon-Electron Interactions in Piezoelectric Semiconductor Bulk Acoustic Wave Resonators," Scientific Reports, vol. 4, Article No. 5617, Jul. 2014, 10 pages.

Sis, S.A., "Ferroelectric-on-Silicon Switchable Bulk Acoustic Wave Resonators and Filters for RF Applications," A dissertation submitted in partial fulfillment of the requirements for the degree of Doctor of Philosophy (Electrical Engineering) in The University of Michigan, 2014, 152 pages.

Tirado, J.V., "Bulk Acoustic Wave Resonators and their Application to Microwave Devices," Ph.D Dissertation, Department of Telecommunications and Systems Engineering, Universitat Autonoma de Barcelona (UAB), 2010, 201 pages.

Elkholy, M. et al., "Low-Loss Integrated Passive CMOS Electrical Balance Duplexers With Single-Ended LNA," IEEE Transactions on Microwave Theory and Techniques, vol. 64, No. 5, May 2016, IEEE, pp. 1544-1559.

Kang, P. et al., "Dual-Band CMOS RF Front-End Employing an Electrical-Balance Duplexer an N-Path LNA for IBFD and FDD Radios," IEEE Transactions on Microwave Theory and Techniques, vol. 69, No. 7, Jul. 2021, IEEE, pp. 3528-3539.

Yu, X., "Design of reconfigurable multi-mode RF circuits," A dissertation submitted to the graduate faculty in partial fulfillment of

(56) References Cited

OTHER PUBLICATIONS the requirements for the degree of Doctor of Philosophy, Iowa State University, Ames, Iowa, 2013, 127 pages.

Khan, A.I. et al., "Negative Capacitance in a Ferroelectric Capacitor," Nature Materials, vol. 14, Feb. 2015, first published Dec. 2014, Macmillan Publishers Limited, pp. 182-186.

* cited by examiner

PASSIVE ACOUSTIC SENSOR CIRCUIT AND RELATED WIRELESS SENSING SYSTEM

RELATED APPLICATIONS

This application claims the benefit of U.S. provisional patent application Ser. No. 63/396,669, filed on Aug. 10, 2022, the disclosure of which is hereby incorporated herein by reference in its entirety.

FIELD OF THE DISCLOSURE

The technology of the disclosure relates generally to a wireless sensing system, and more specifically to a wireless sensing system operable based on a passive acoustic sensor circuit.

BACKGROUND

Wireless devices have become increasingly common in current society. The prevalence of wireless devices is driven in part by a rich user experience powered by a variety of applications, environmental awareness, and friendlier user interfaces provided by these wireless devices. To enable the rich user experience, todays wireless devices (e.g., smartphone, smartwatch, tablet, etc.) are often equipped with a variety of sensors (e.g., touch sensor, biometric sensor, motion sensor, temperature sensor, etc.) to detect user interaction and/or environmental changes.

FIG. 1 is a schematic diagram of an exemplary conventional wireless device 10 wherein a variety of sensors 12 are connected to a processing circuit 14 via multiple physical wires 16. Notably, the physical wires 16 must be carefully laid out to avoid interference with each other and with other active and passive circuits in the existing wireless device 10. This is becoming increasingly challenging as more and more components/circuits are added into the existing wireless device 10 to achieve a greater number of functionalities. As such, it is desirable to reduce, or even eliminate, the physical wires 16 to help reduce design and manufacturing complexities of the existing wireless device 10.

SUMMARY

Embodiments of the disclosure relate to a passive acoustic sensor circuit and related wireless sensing system. The passive acoustic sensor circuit is configured to induce an electrical current in response to receiving a radio frequency (RF) signal. The passive acoustic sensor circuit includes a sensor circuit, which can detect a sensory event (e.g., a touch or key press) and cause a variation in the electrical current in response to the sensory event. In contrast, the sensor circuit will not cause the variation in the electrical current in absence of the sensory event. In this regard, the presence or absence of the current variation, which can be detected remotely and wirelessly, will serve as an indication of the sensory event. By detecting the current variation remotely and wirelessly, it is possible to reduce physical wiring in an electronic device (e.g., smartphone, smartwatch, etc.) to help reduce design and manufacturing complexities of the electronic device.

In one aspect, a wireless sensing system is provided. The wireless sensing system includes a passive acoustic sensor circuit. The passive acoustic sensor circuit includes a conductive structure. The conductive structure is configured to induce an electrical current between an input node and an output node in response to receiving an RF signal. The passive acoustic sensor circuit also includes an acoustic resonator. The acoustic resonator is configured to resonate at a serial resonance frequency to pass the electrical current between the input node and the output node. The acoustic resonator is also configured to block the electrical current between the input node and the output node at a parallel resonance frequency different from the serial resonance frequency. The passive acoustic sensor circuit also includes a sensor circuit. The sensor circuit is configured to cause a variation of the electrical current at the parallel resonance frequency in response to detecting a sensory event.

In another aspect, a passive acoustic sensor circuit is provided. The passive acoustic sensor circuit includes a conductive structure. The conductive structure is configured to induce an electrical current between an input node and an output node in response to receiving an RF signal from a transceiver circuit. The passive acoustic sensor circuit also includes an acoustic resonator. The acoustic resonator is configured to resonate at a serial resonance frequency to pass the electrical current between the input node and the output node. The acoustic resonator is also configured to block the electrical current between the input node and the output node at a parallel resonance frequency different from the serial resonance frequency. The passive acoustic sensor circuit also includes a sensor circuit. The sensor circuit is configured to cause a variation of the electrical current at the parallel resonance frequency in response to detecting a sensory event.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
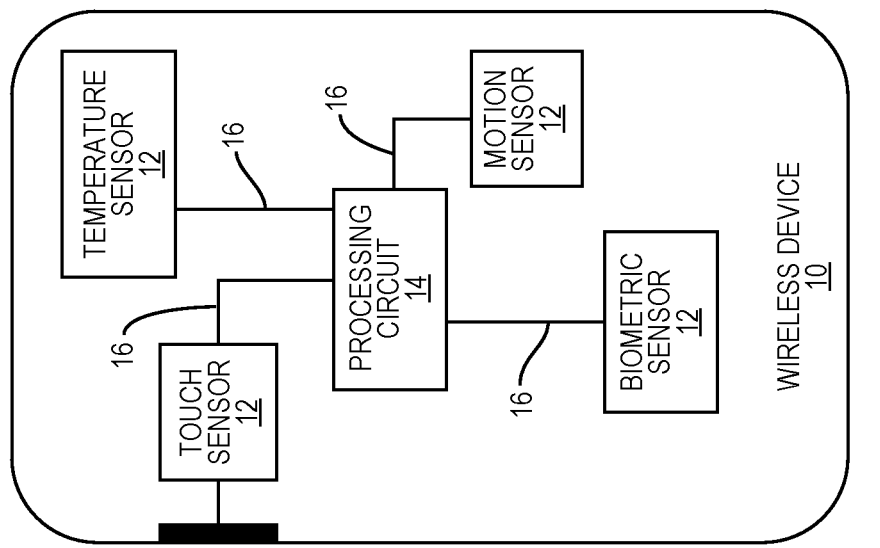
FIG. 1 is a schematic diagram of an exemplary conventional wireless device wherein a variety of sensors are connected to a processing circuit via multiple physical wires.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a passive acoustic sensor circuit and related wireless sensing system. The passive acoustic sensor circuit is configured to induce an electrical current in response to receiving a radio frequency (RF) signal. The passive acoustic sensor circuit includes a sensor circuit, which can detect a sensory event (e.g., a touch or key press) and cause a variation in the electrical current in response to the sensory event. In contrast, the sensor circuit will not cause the variation in the electrical current in absence of the sensory event. In this regard, the presence or absence of the current variation, which can be detected remotely and wirelessly, will serve as an indication of the sensory event. By detecting the current variation remotely and wirelessly, it is possible to reduce physical wiring in an electronic device (e.g., smartphone, smartwatch, etc.) to help reduce design and manufacturing complexities of the electronic device.

Figure 2:
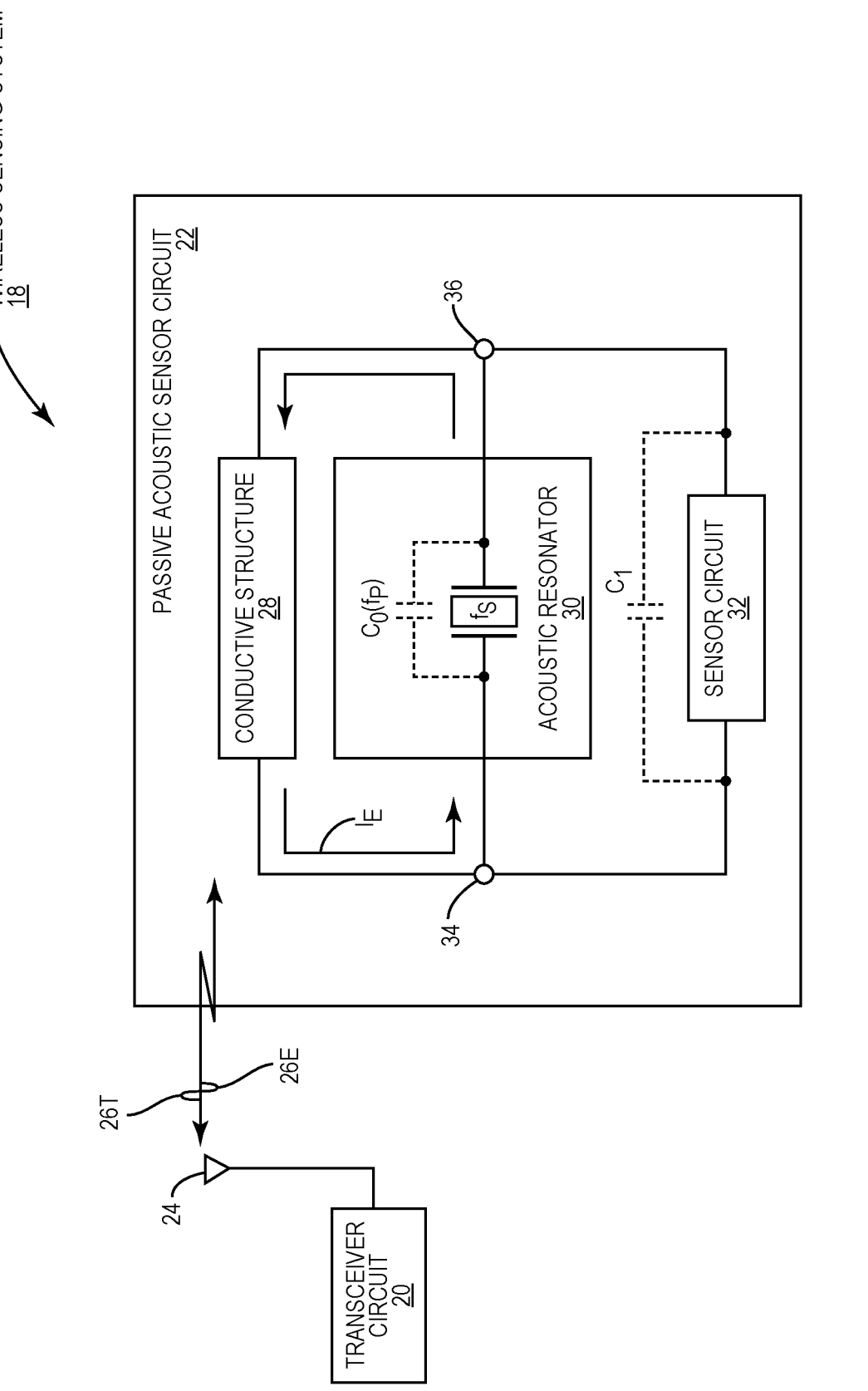
FIG. 2 is a schematic diagram of an exemplary wireless sensing system wherein a transceiver circuit is configured according to embodiments of the present disclosure to wirelessly detect a sensory event in a passive acoustic sensor circuit.

FIG. 2 is a schematic diagram of an exemplary wireless sensing system 18 wherein a transceiver circuit 20 is configured according to embodiments of the present disclosure to wirelessly detect a sensory event in a passive acoustic sensor circuit 22. The transceiver circuit 20 may include, or be coupled to, an antenna circuit 24. Herein, the transceiver circuit 20 is configured to transmit, via the antenna circuit 24, an RF signal 26T (e.g., an impulse signal) toward the passive acoustic sensor circuit 22 and receives an echo 26E of the transmitted RF signal 26T reflected by the passive acoustic sensor circuit 22. As described in detail below, the transceiver circuit 20 can remotely determine whether the sensory event has happened in the passive acoustic sensor circuit 22 based on one or more characteristics associated with the transmitted RF signal 26T and the echo 26E of the transmitted RF signal 26T. As such, it is possible to reduce physical wiring in the passive acoustic sensor circuit 22 to help reduce design and manufacturing complexities of an electronic device employing the wireless sensing system 18.

According to an embodiment of the present disclosure, the passive acoustic sensor circuit 22 includes a conductive structure 28, an acoustic resonator 30, and a sensor circuit 32 that are coupled in parallel between an input node 34 and an output node 36. The conductive structure 28 can include a receiving structure (e.g., a loop antenna, a conductive coil, etc.) (not shown) to induce an electrical current $I_E$ in response to receiving the RF signal 26T. Notably, the passive acoustic sensor circuit 22 does not include any direct-current (DC) or alternative current (AC) power source and the electrical current $I_E$ is solely induced by the RF signal 26T.

The acoustic resonator 30 is configured to resonate at a serial resonance frequency $f_S$ (a.k.a. passband frequency) to pass the electrical current $I_E$ from the input node 34 to the output node 36 to thereby cause a circulation of the electrical current $I_E$ between the conductive structure 28 and the acoustic resonator 30. In this regard, the acoustic resonator 30 is functioning as a closed switch at the serial resonance frequency $f_S$.

In contrast, the acoustic resonator 30 will function as a capacitor at a parallel resonance frequency $f_P$ (a.k.a. stopband frequency) to present a first capacitance $C_O$ between the input node 34 and the output node 36. In this regard, the acoustic resonator 30 is functioning as an open switch to block the electrical current $I_E$ at the parallel resonance frequency $f_P$. As a result, there will be no circulation of the electrical current $I_E$ in the passive acoustic sensor circuit 22.

The sensor circuit 32 is configured to detect a presence or absence of a sensory event (e.g., screen touch, key press, temperature change, motion change, etc.) in an electronic device (e.g., smartphone, smartwatch, etc.) and cause a variation of the electrical current $I_E$ in response to detecting the presence of the sensory event. According to various embodiments of the present disclosure, in absence of the sensory event, the sensor circuit 32 is configured to provide a second capacitance $C_1$, which substantially equals four times the first capacitance $C_0$ ($C_1 \approx 4 \times C_0$), between the input node 34 and the output node 36 to thereby block any circulation of the electrical current $I_E$ in the passive acoustic sensor circuit 22. In this regard, the sensor circuit 32 also functions as an open switch between the input node 34 and the output node 36 in absence of the sensory event.

However, when the sensory event occurs, the second capacitance $C_1$ will be changed to break the equilibrium. As a result, at least a portion of the electrical current $I_E$ will flow from the input node 34 to the output node 36 to thereby cause the variation of the electrical current $I_E$. This current variation can trigger certain characteristics to change in the echo 26E of the transmitted RF signal 26T, thus allowing the transceiver circuit 20 to detect the sensory event wirelessly via the changed characteristics in the echo 26E of the transmitted RF signal 26T.

Figure 3B:
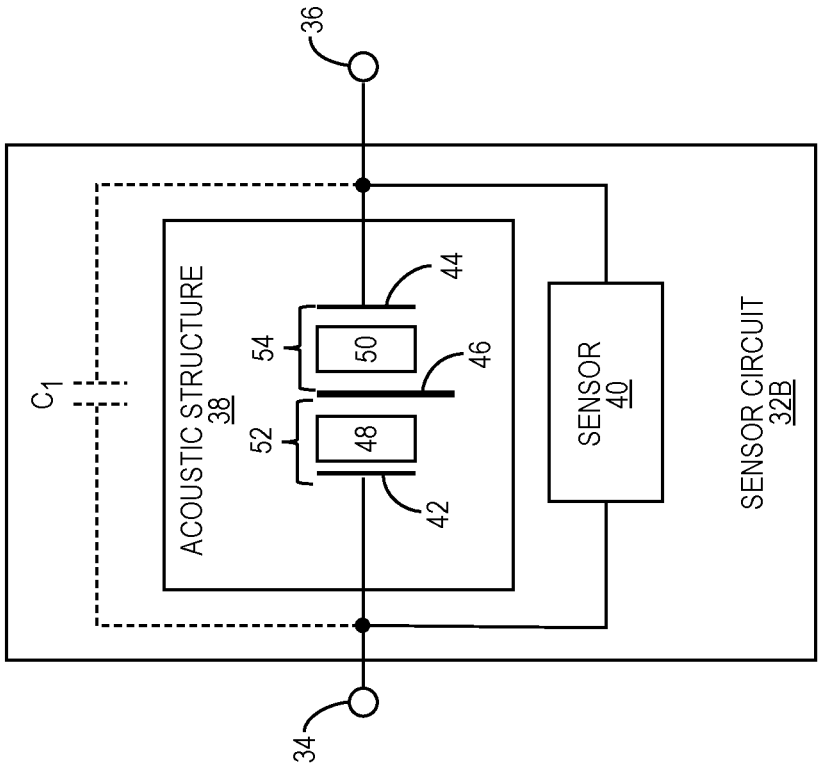
FIGS. 3A and 3B are schematic diagrams providing exemplary illustrations of a sensor circuit configured according to embodiments of the present disclosure to detect the sensory event in the passive acoustic sensor circuit in FIG. 2.
Figure 3B:
Figure 3A:
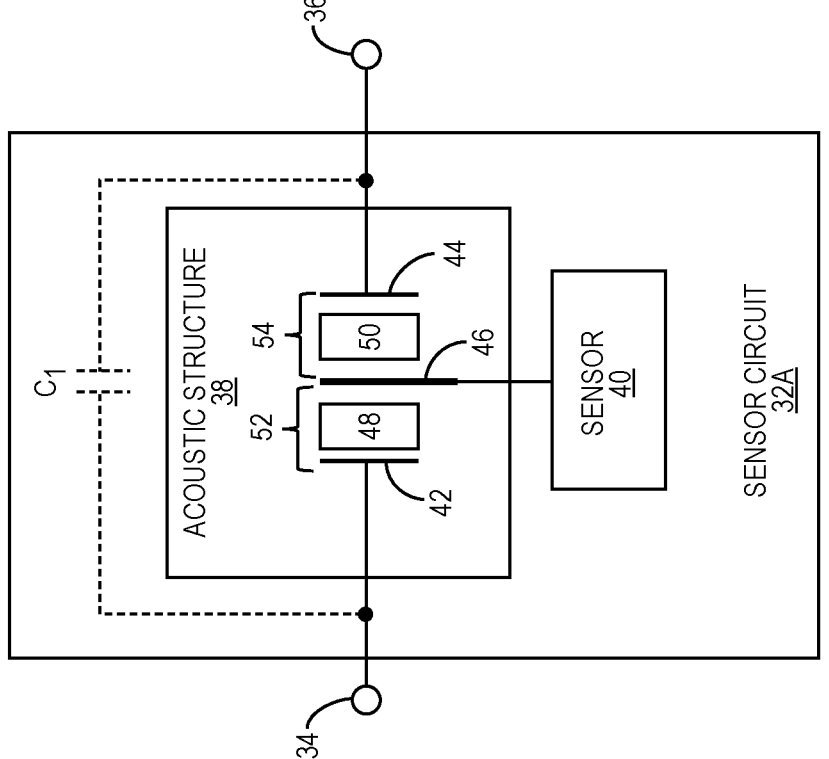

FIGS. 3A and 3B are schematic diagrams providing exemplary illustrations of the sensor circuit 32 configured according to embodiments of the present disclosure to detect the sensory event in the passive acoustic sensor circuit 22 in FIG. 2. Common elements between FIGS. 2, 3A, and 3B are shown therein with common element numbers and will not be re-described herein.

FIG. 3A illustrates a sensor circuit 32A configured according to one embodiment of the present disclosure to detect the sensory event in the passive acoustic sensor circuit 22 in FIG. 2. The sensor circuit 32A includes an acoustic structure 38 and a sensor 40 (e.g., touch sensor, biometric sensor, motion sensor, temperature sensor, etc.).

The acoustic structure 38 includes a first electrode 42, a second electrode 44, and a third electrode 46. The third electrode 46 is sandwiched in between the first electrode 42 and the second electrode 44. The acoustic structure 38 includes a first piezo layer 48 provided between the first electrode 42 and the third electrode 46. The acoustic structure 38 also includes a second piezo layer 50 provided between the second electrode 44 and the third electrode 46. In a non-limiting example, the first piezo layer 48 and the second piezo layer 50 can be formed by quartz crystal. The thickness and/or mass of the first piezo layer 48 and the second piezo layer 50 may be so determined to cause the acoustic structure 38 to resonate in the parallel resonance frequency ($f_P$).

The first electrode 42, the first piezo layer 48, and the third electrode 46 may be seen as collectively forming a first acoustic resonator 52. Likewise, the second electrode 44, the second piezo layer 50, and the third electrode 46 may be seen as collectively forming a second acoustic resonator 54. In this regard, the acoustic structure 38 may be seen as being formed by stacking the first acoustic resonator 52 with the second acoustic resonator 54. Both the first acoustic resonator 52 and the second acoustic resonator 54 are configured to resonate in the parallel resonance frequency ($f_P$).

In one non-limiting example, the first electrode 42, the first piezo layer 48, and the third electrode 46 can form a polarized acoustic resonator based on a c-type structure. In this regard, the first piezo layer 48 expands in response to a positive voltage and compresses in response to a negative voltage. In this non-limiting example, the second electrode 44, the second piezo layer 50, and the third electrode 46 can form a polarized inverted acoustic resonator based on an f-type structure. In this regard, the second piezo layer 50 expands in response to a negative voltage and compresses in response to a positive voltage. The acoustic structure 38 is configured to provide the second capacitance $C_1$ between the input node 34 and the output node 36. In absence of the sensory event, the second capacitance $C_1$ is substantially equal to four times the first capacitance $C_0$ to thereby establish the equilibrium to prevent any circulation of the electrical current $I_E$ in the passive acoustic sensor circuit 22.

Herein, the sensor 40 is coupled to the third electrode 46 of the acoustic structure 38. When the sensory event occurs, the sensor 40 will cause the second capacitance $C_1$ to change (increase or decrease). As such, the equilibrium ($C_1 \approx 4 \times C_0$) is broken to thereby cause the variation of the electrical current $I_E$.

FIG. 3B illustrates a sensor circuit 32B configured according to another embodiment of the present disclosure to detect the sensory event in the passive acoustic sensor circuit 22 in FIG. 2. Herein, instead of being coupled to the third electrode 46, the sensor 40 is coupled between the input node 34 and the output node 36 in parallel to the acoustic structure 38.

With reference back to FIG. 2, the transceiver circuit 20 can detect the variation of the electrical current $I_E$ and, thereby, the sensory event in the passive acoustic sensor circuit 22 according to a number of embodiments. In one embodiment, the conductive structure 28 can be configured to include a linear antenna (not shown). In this regard, the transceiver circuit 20 may transmit the RF signal 26T in the parallel resonance frequency $f_P$ and receive the echo 26E also in the parallel resonance frequency $f_P$. In one embodiment, the transceiver circuit 20 may determine that the sensory event has occurred when a voltage standing wave ratio (VSWR) between the transmitted RF signal 26T and the echo 26E of the transmitted RF signal 26T is above a predefined threshold. In another embodiment, the transceiver circuit 20 may determine that the sensory event has occurred based on one or more harmonics associated with the echo 26E of the transmitted RF signal 26T. Moreover, the transceiver circuit 20 may also be able to determine a magnitude of the sensory event (e.g., how hard a key was pressed, how erratic a motion was made, etc.) based on, for example, number and/or amplitude of the harmonics.

In one embodiment, the conductive structure 28 can be configured to include a nonlinear antenna (not shown). In this regard, the transceiver circuit 20 may transmit the RF signal 26T in both the serial resonance frequency $f_S$ and the parallel resonance frequency $f_P$. The nonlinearity of the nonlinear antenna may cause one or more intermodulation products (IMSs) between the RF signal 26T in the serial resonance frequency $f_S$ and the parallel resonance frequency $f_P$ and be echoed back in the echo 26E of the transmitted RF signal 26T. Accordingly, the transceiver circuit 20 may detect the sensory event in the passive acoustic sensor circuit 22 based on, for example, number, amplitude, and/or location of the IMDs associated with the echo 26E.

Given that the transceiver circuit 20 has no prior knowledge as to when the sensory event would happen in the passive acoustic sensor circuit 22, the transceiver circuit 20 may be configured to transmit the RF signal 26T periodically. In a non-limiting example, the transceiver circuit 20 can be configured to repeat the RF signal 26T every millisecond.

Figure 4:
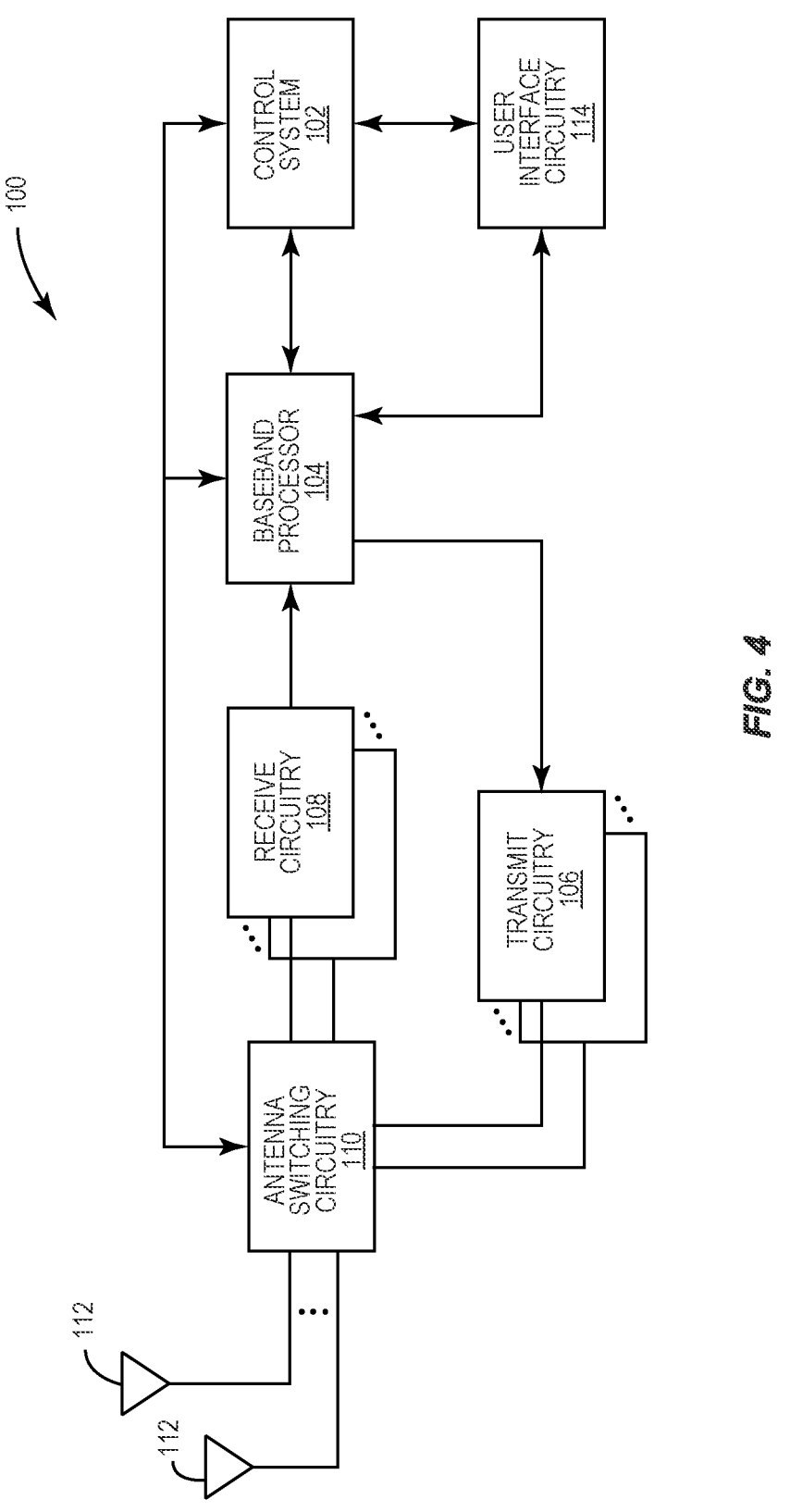
FIG. 4 is a schematic diagram of an exemplary user element wherein the wireless sensing system of FIG. 2 can be provided.

The wireless sensing system 18 of FIG. 2 can be provided in a user element to enable bandwidth adaptation according to embodiments described above. In this regard, FIG. 4 is a schematic diagram of an exemplary user element 100 wherein the wireless sensing system 18 of FIG. 2 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

Those skilled in the art will recognize improvements and modifications to the preferred embodiments of the present disclosure. All such improvements and modifications are considered within the scope of the concepts disclosed herein and the claims that follow.

What is claimed is:

1. A wireless sensing system comprising:
a passive acoustic sensor circuit comprising:
a conductive structure configured to induce an electrical current between an input node and an output node in response to receiving a radio frequency (RF) signal;
an acoustic resonator configured to:
resonate at a serial resonance frequency to pass the electrical current between the input node and the output node; and
block the electrical current between the input node and the output node at a parallel resonance frequency different from the serial resonance frequency; and a sensor circuit configured to cause a variation of the electrical current at the parallel resonance frequency in response to detecting a sensory event.

2. The wireless sensing system of claim 1, further comprising a transceiver circuit configured to:
transmit the RF signal toward the passive acoustic sensor circuit and receive an echo of the transmitted RF signal reflected by the passive acoustic sensor circuit; and
determine the variation of the electrical current in the passive acoustic sensor circuit based on the transmitted RF signal and the echo of the transmitted RF signal to thereby detect the sensory event.

3. The wireless sensing system of claim 2, wherein:
the conductive structure comprises a linear antenna; and
the transceiver circuit is further configured to transmit the RF signal at the parallel resonance frequency.

4. The wireless sensing system of claim 3, wherein the transceiver circuit is further configured to detect the variation of the electrical current in response to a voltage standing wave ratio (VSWR) measured based on the transmitted RF signal and the echo of the transmitted RF signal being above a predefined threshold.

5. The wireless sensing system of claim 3, wherein the transceiver circuit is further configured to detect the variation of the electrical current based on one or more harmonics associated with the echo of the transmitted RF signal.

6. The wireless sensing system of claim 2, wherein:
the conductive structure comprises a nonlinear antenna; and
the transceiver circuit is further configured to transmit the RF signal concurrently in the serial resonance frequency and the parallel resonance frequency.

7. The wireless sensing system of claim 6, wherein the transceiver circuit is further configured to detect the variation of the electrical current based on one or more intermodulation products associated with the echo of the transmitted RF signal.

8. The wireless sensing system of claim 1, wherein:
the acoustic resonator is configured to cause a first capacitance between the input node and the output node at the parallel resonance frequency; and
the sensor circuit is configured to:
cause a second capacitance that is equal to four times the first capacitance between the input node and the output node in absence of the sensory event; and
cause the second capacitance that is not equal to four times the first capacitance between the input node and the output node in a presence of the sensory event.

9. The wireless sensing system of claim 1, wherein the sensor circuit comprises an acoustic structure coupled between the input node and the output node, and a sensor coupled to the acoustic structure.

10. The wireless sensing system of claim 1, wherein the sensor circuit comprises an acoustic structure and a sensor each coupled between the input node and the output node.

11. A passive acoustic sensor circuit comprising:
a conductive structure configured to induce an electrical current between an input node and an output node in response to receiving a radio frequency (RF) signal from a transceiver circuit;
an acoustic resonator configured to:
resonate at a serial resonance frequency to pass the electrical current between the input node and the output node; and block the electrical current between the input node and the output node at a parallel resonance frequency different from the serial resonance frequency; and a sensor circuit configured to cause a variation of the electrical current at the parallel resonance frequency in response to detecting a sensory event.

12. The passive acoustic sensor circuit of claim 11, wherein the transceiver circuit is configured to determine the variation of the electrical current in the passive acoustic sensor circuit based on the transmitted RF signal and the echo of the transmitted RF signal to thereby detect the sensory event.

13. The passive acoustic sensor circuit of claim 12, wherein the transceiver circuit is further configured to detect the variation of the electrical current in response to a voltage standing wave ratio (VSWR) measured based on the transmitted RF signal and the echo of the transmitted RF signal being above a predefined threshold.

14. The passive acoustic sensor circuit of claim 12, wherein the transceiver circuit is further configured to detect the variation of the electrical current based on one or more harmonics associated with the echo of the transmitted RF signal.

15. The passive acoustic sensor circuit of claim 11, wherein the conductive structure comprises a linear antenna configured to receive the RF signal at the parallel resonance frequency.

16. The passive acoustic sensor circuit of claim 11, wherein the conductive structure comprises a nonlinear antenna configured to receive the RF signal concurrently in the serial resonance frequency and the parallel resonance frequency.

17. The passive acoustic sensor circuit of claim 16, wherein the transceiver circuit is further configured to detect the variation of the electrical current based on one or more intermodulation products associated with the echo of the transmitted RF signal.

18. The passive acoustic sensor circuit of claim 11, wherein:

the acoustic resonator is configured to cause a first capacitance between the input node and the output node at the parallel resonance frequency; and the sensor circuit is configured to:

cause a second capacitance that is equal to four times the first capacitance between the input node and the output node in absence of the sensory event; and cause the second capacitance that is not equal to four times the first capacitance between the input node and the output node in a presence of the sensory event.

19. The passive acoustic sensor circuit of claim 11, wherein the sensor circuit comprises an acoustic structure coupled between the input node and the output node, and a sensor coupled to the acoustic structure.

20. The passive acoustic sensor circuit of claim 11, wherein the sensor circuit comprises an acoustic structure and a sensor each coupled between the input node and the output node.

* * * * *